(12) United States Patent
Uchida et al.

(10) Patent No.: US 10,370,557 B2
(45) Date of Patent: Aug. 6, 2019

(54) D1563 RADIATION CURABLE SECONDARY COATING FOR OPTICAL FIBERS

(71) Applicant: DSM IP Assets B.V., Heerlen TE (NL)

(72) Inventors: Hirofumi Uchida, Tokyo (JP); Zen Komiya, Tokyo (JP)

(73) Assignee: DSM IP Assets B.V., Te Heerlen (NL)

( * ) Notice: Subject to any disclaimer, the term of this patent is extended or adjusted under 35 U.S.C. 154(b) by 22 days.

(21) Appl. No.: 15/527,746

(22) PCT Filed: Nov. 18, 2015

(86) PCT No.: PCT/NL2015/050804
§ 371 (c)(1),
(2) Date: May 18, 2017

(87) PCT Pub. No.: WO2016/080829
PCT Pub. Date: May 26, 2016

(65) Prior Publication Data
US 2017/0355874 A1  Dec. 14, 2017

(30) Foreign Application Priority Data

Nov. 19, 2014 (JP) .................................. 2014-234555
Jan. 29, 2015 (EP) ..................................... 15153050

(51) Int. Cl.

| | | |
|---|---|---|
| C09D 135/02 | (2006.01) | |
| C08F 220/34 | (2006.01) | |
| C08F 222/22 | (2006.01) | |
| C08F 290/06 | (2006.01) | |
| C09D 133/06 | (2006.01) | |
| C09D 151/08 | (2006.01) | |
| C09D 175/16 | (2006.01) | |
| G02B 6/00 | (2006.01) | |
| C08F 222/20 | (2006.01) | |
| G02B 6/02 | (2006.01) | |
| C08G 18/48 | (2006.01) | |
| C08G 18/67 | (2006.01) | |
| C08G 18/24 | (2006.01) | |

(52) U.S. Cl.
CPC .......... *C09D 135/02* (2013.01); *C08F 220/34* (2013.01); *C08F 222/20* (2013.01); *C08F 222/22* (2013.01); *C08F 290/067* (2013.01); *C08G 18/246* (2013.01); *C08G 18/4825* (2013.01); *C08G 18/672* (2013.01); *C09D 133/066* (2013.01); *C09D 151/08* (2013.01); *C09D 175/16* (2013.01); *G02B 6/00* (2013.01); *G02B 6/02395* (2013.01)

(58) Field of Classification Search
CPC combination set(s) only.
See application file for complete search history.

(56) References Cited

U.S. PATENT DOCUMENTS

| | | |
|---|---|---|
| 5,837,750 A | 11/1998 | Szum |
| 6,080,483 A | 6/2000 | Szum |
| 6,472,450 B2 | 10/2002 | Szum |
| 6,862,392 B2 * | 3/2005 | Fabian .................. C03C 25/106 385/126 |
| 2014/0079367 A1 | 3/2014 | Wu et al. |

FOREIGN PATENT DOCUMENTS

| | | |
|---|---|---|
| JP | 2008249788 | 10/2008 |
| JP | 2008249788 A | 10/2008 |
| WO | WO200149629 | 7/2001 |
| WO | WO2002081396 | 10/2002 |
| WO | WO2005026228 A1 | 3/2005 |
| WO | WO2005090488 A1 | 9/2005 |
| WO | WO2014077688 A1 | 5/2014 |

* cited by examiner

*Primary Examiner* — Sanza L. McClendon
(74) *Attorney, Agent, or Firm* — Daniel S. Bujas; Kevin M. Bull

(57) ABSTRACT

A radiation curable secondary coating composition for optical fiber is described and claimed. This radiation curable secondary coating composition includes component (A) which is a urethane (meth)acrylate and component (B) which is a (meth)acrylate compound with two or more ethylenically unsaturated groups and one or more bisphenol structures; wherein the content of component (B) in the composition is 60-300 mass parts per 100 mass parts of component (A). The liquid secondary coating has a viscosity at 25° C. of from about 0.1 Pa·s to about 15 Pa·s. Films obtained by curing the liquid radiation curable secondary coating composition of the present invention have a Young's modulus of from about 600 MPa to about 500 MPa and the breaking elongation of the cured film is from about to 5% to about 50%.

20 Claims, 1 Drawing Sheet

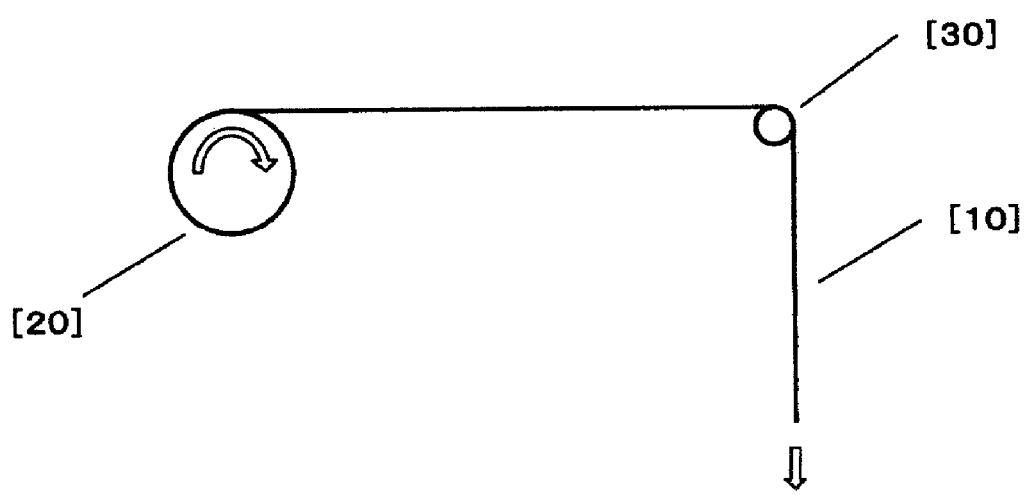

D1563 RADIATION CURABLE SECONDARY COATING FOR OPTICAL FIBERS

This application is the US National Phase application of International Application No. PCT/NL2015/0505804, filed 18 Nov. 2015, which designated the US and claims priority to Japanese Application Number JP 2014-234555, the entire contents of each of which are hereby incorporated by reference.

FIELD OF THE INVENTION

The present invention relates to radiation curable secondary coatings for optical fibers.

BACKGROUND OF THE INVENTION

In the production of optical fibers, glass fibers are heated and melt-spun, and one or more layers of radiation curable coatings are applied for protection and reinforcement. This process is called "drawing". A structure is known in which a flexible primary coating layer is first placed on the surface of the optical fiber and a secondary coating layer with a high toughness (referred to below as "secondary coating layer") is placed on top of the primary coating layers. Moreover, in order to make optical fiber with these radiation curable coatings applied to them suited for practical use, a structure is known in which a plurality of coated optical fibers are arranged on a flat surface, fixed with a binding material-known as a "matrix" coating, and optionally covered with further coating layers to form a structure known as a "ribbon" of optical fiber.

When the primary and secondary coating layers are formed on the surface of the optical fiber, two layers of radiation curable liquid coating are applied by means of a coating applicators, and the glass fiber is pulled at high speed and passes through a cylindrical body in a photoirradiation apparatus, at which time the composition is cured by the radiation emitted from the irradiation apparatus. When this is done, ultraviolet light is preferably used as the irradiated light which cures the layers of radiation curable coatings; mercury-vapor lamps or metal-halide lamps are primarily used as sources of this ultraviolet light.

It is generally preferred for the secondary coating layer of optical fibers to have a rigid property, with a high Young's modulus. In order to form this kind of coating layer, a radiation curable liquid coating composition with excellent curability by means of radiation is needed. If the curability is inferior, the curing of the surface layer of the secondary coating layer will be insufficient, and optical fiber with the necessary strength cannot be produced.

Furthermore, it is preferred for the secondary coating layer to have a high abrasion resistance. Since it is the outermost layer, except when overcoat layers such as upjacket layers or ink layers are used, the secondary coating layer is destroyed and the optical properties of the optical fiber cable are harmed when there is a large amount of physical contact with the outside world and the abrasion resistance is insufficient.

As conventional secondary coating materials, liquid radiation curable compositions in which the quantity of urethane (meth)acrylate is raised and a Young's modulus which is suitable for a secondary coating layer is realized are described in Unexamined Patent Application Public Disclosure No. 2008-247981 and Unexamined Patent Application Public Disclosure No. 2007-77326.

Moreover, a liquid radiation curable composition is described in Unexamined Patent Application Public Disclosure No. 2008-249788 in which an overcoat layer with a high Young's modulus, like secondary coating layers, is formed by using ethylene-oxide-modified diacrylates of bisphenol A as an overcoat-layer-forming material which differs from the secondary coating material.

However, with the conventional liquid radiation curable compositions for secondary coating layers of optical fiber, it was not possible to obtain secondary coating layers with properties which combined high radiation curability and abrasion resistance. Therefore, it is preferred to formulate secondary coatings for optical fiber in such a way as to make them have good abrasion resistance and be good curing coatings.

SUMMARY OF THE INVENTION

The first aspect of the instant claimed invention is a radiation curable secondary coating composition for optical fiber which comprises
(A) a urethane (meth)acrylate and
(B) a (meth)acrylate compound with two or more ethylenically unsaturated groups and one or more bisphenol structures;
wherein the content of component (B) in the composition is 60-300 mass parts per 100 mass parts of component (A).

The second aspect of the instant claimed invention is a radiation curable secondary coating composition of the first aspect, further comprising component (C) with one or more ethylenically unsaturated groups, said component (C) being other than components (A) and (B).

The third aspect of the instant claimed invention is a radiation curable secondary coating layer on optical fiber, obtained by curing the radiation curable secondary coating composition of any one of the first and second aspects of the instant claimed invention.

The fourth aspect of the instant claimed invention is an optical fiber which comprises the secondary coating layer of the third aspect of the instant claimed invention.

The purpose of the present invention is to provide a liquid radiation curable composition for secondary coating layers of optical fiber which is excellent in its function as an optical fiber coating material, especially, one which is excellent in hardness, resistance to external injury, and abrasion resistance.

Therefore, the inventors compounded various ingredients in liquid radiation curable compositions containing urethane (meth)acrylates and investigated the strengths and functions as optical fiber coating layers, and the detachabilities, of the cured compositions. As a result, they discovered that the purposes mentioned above could be accomplished by using combinations of a urethane (meth)acrylate and a (meth)acrylate with two or more ethylenically unsaturated groups and one or more bisphenol structures.

The present invention provides a composition which is a liquid radiation curable composition for secondary coating layers of optical fiber which comprises
(A) a urethane (meth)acrylate and
(B) a (meth)acrylate with two or more ethylenically unsaturated groups and one or more bisphenol structures;
wherein the content of component (B) in the composition is 60-300 mass parts per 100 mass parts of the content of component (A).

Moreover, the present invention provides a secondary coating layer of optical fiber which is obtained by applying and curing this liquid radiation curable composition as a secondary coating layer on optical fiber.

Furthermore, the present invention provides optical fibers with a secondary coating layer as described herein.

The coating obtained by means of the liquid radiation curable composition of the present invention resists external damage because it has a very high Young's modulus and its breaking elongation is small.

BRIEF DESCRIPTION OF THE DRAWING

FIG. 1 is a drawing which shows an outline of the device used for the abrasion resistance test in the test examples.

DETAILED DESCRIPTION OF THE INVENTION

The first aspect of the instant claimed invention is a radiation curable secondary coating composition for optical fiber which comprises
(A) a urethane (meth)acrylate and
(B) a (meth)acrylate compound with two or more ethylenically unsaturated groups and one or more bisphenol structures;
wherein the content of component (B) in the composition is from about 60 to about 300 mass parts per 100 mass parts of component (A).

The component (A) of the present invention is a urethane (meth)acrylate. Urethane (meth)acrylates are produced by reactions of polyisocyanates and (meth)acrylates which contain hydroxyl groups, or reactions of polyols, polyisocyanates, and (meth)acrylates which contain hydroxyl groups. That is, they are produced by causing the isocyanate groups of the polyisocyanates to react with the hydroxyl groups of the polyols or with the polyols and the hydroxyl groups of the (meth)acrylates which contain hydroxyl groups.

Methods for performing these reactions include, but are not limited to,
a) the method of charging the polyols, polyisocyanates, and (meth)acrylates which contain hydroxyl groups all at once and reacting them;
b) the method of reacting the polyols and polyisocyanates and then reacting the (meth)acrylates which contain hydroxyl groups;
c) the method of reacting the polyisocyanates and the (meth)acrylates which contain hydroxyl groups, and then reacting the polyols; and
d) the method of reacting the polyisocyanates and the (meth)acrylates which contain hydroxyl groups, then reacting the polyols, and finally reacting the (meth)acrylates which contain hydroxyl groups again.

The polyols which may be used are not particularly limited, but one may use aliphatic polyols, polyols with alicyclic structures, polyols with aromatic structures, caprolactone polyols, etc. Among these, aliphatic polyols are preferred.

Suitable aliphatic polyols, include, but are not limited to polyethyl polyols. Examples of these polyethyl polyols are polyethylene glycol, polypropylene glycol, polytetramethylene glycol, polyhexamethylene glycol, polyheptamethylene glycol, polydecamethylene glycol, or aliphatic polyether polyols obtained by the open-ring copolymerization of two or more kinds of ion-polymerizable cyclic compounds. Suitable ion-polymerizable cyclic compounds are ethylene oxide, propylene oxide, butene-1-oxide, isobutene oxide, 3,3-bis(chloromethyl)oxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, aryl glycidyl ether, aryl glycidyl carbonate, butadiene monooxide, isopropene monooxide, vinyl oxetane, vinyl tetrahydrofuran, vinyl cyclohexene oxide, cyclic ethers such as phenyl glycidyl ether, butyl glycidyl ether, and glycidyl benzoate ester, etc. Moreover, one can also use polyether polyols produced by ring-opening copolymerization of the aforementioned ion-polymerizable cyclic compounds and cyclic imines, such as ethyleneimine, cyclic lactones, such as β-propiolactone, glycolic acid lactide, etc., or dimethylcyclopolysiloxanes. Specific examples of the aforementioned compounds of two or more ion-polymerizable cyclic compounds are tetrahydrofuran and propylene oxide, tetrahydrofuran and 2-methyltyetrahydrofuran, tetrahydrofuran and 3-methyltetrahydrofuran, tetrahydrofuran and ethylene oxide, propylene oxide and ethylene oxide, butene-1-oxide and ethylene oxide, terpolymers of tetrahydrofuran, butane-1-oxide, and ethylene oxide, etc. These ring-opening copolymers of ion-polymerizable cyclic compounds may be bonded randomly or block bonds may be made.

Suitable, commercially available aliphatic polyether polyols include, but are not limited to, PTMG650, PTMG1000, PTMG 2000 (Mitsubishi Chemical Corp.); PPG-400, PPG1000, PPG2000, PPG3000, EXCENOL720, 1020, 2020 (Asahi Glass Urethane Co.); PEG1000, Yuniseefu DC1100, DC1800 (Nippon Oil & Fats Co.); PPTG2000, PPTG1000, PTG400, PTGL2000 (Hodogaya Chemical Co.); and Z-3001-4, Z-3001-5, PBG2000A, PBG2000B (Daiichi Kogyo Seiyaku Co.); etc. Moreover, diols which are copolymers of butene-1-oxide and ethylene oxide may be obtained as commercial products, for example, EO/BO500, EO/BO1000, EO/BO2000, EO/BO3000, EO/BO4000 (Daiichi Kogyo Seiyaku Co.).

Aromatic polyols may also be used. Aromatic polyols, include, but are not limited to polyols with bisphenol structures. Examples of these aromatic polyols with bisphenol structures are bisphenol-A-alkylene oxide adducts, bisphenol-F-alkylene oxide adducts, etc. Among these, ones with bisphenol A structures are preferable, and bisphenol-A-alkylene oxide adducts are especially preferred. These polyols may be obtained as commercial products, for example, Yuniooru DA400, DA700, DA1000, DB400 (Nippon Oil & Fats Co.), etc.

Alicyclic polyols may also be used. Alicyclic polyols include, but are not limited to, polyols with hydrogenated bisphenol structures. Examples of alicyclic polyols with hydrogenated bisphenol structures are hydrogenated bisphenol A, hydrogenated bisphenol F, hydrogenated bisphenol-A-alkylene oxide adducts, hydrogenated bisphenol-F-alkylene oxide adducts, etc.

Examples of aromatic and aliphatic polyisocyanates that can be used, include, but are not limited to, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylene bis(4-cyclohexyl isocyanate), 2,2,4-trimethylhexamethylene diisocyanate, bis(2-isocyanate ethyl) fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, and tetramethylxylylene diisocyanate, 2,5 (or 2,6)-bis(isocyanate methyl)-bicyclo[2.2.1]heptane, etc. Among these, 2,4-tolylene diisocyanate, isophorone diisocyanate, xylylene diisocyanate, methylene b is (4-cyclohexyl isocyanate) are preferred.

These polyisocyanates may be used individually or in combinations of two or more.

Examples of (meth)acrylates containing hydroxyl groups are 2-hydroxyethyl (meth)acrylate, 2-hydroxypropyl (meth)acrylate, 2-hydroxybutyl (meth)acrylate, 2-hydroxy-3-phenyloxypropyl (meth)acrylate, 1,4-butane polyol mono (meth)acrylate, 2-hydroxyalkyl (meth)acryloyl phosphate, 4-hydroxycyclohexyl (meth)acrylate, 1,6-hexane polyol mono(meth)acrylate, neopentyl glycol mono(meth)acrylate, trimethylol propane di(meth)acrylate, trimethylol ethane (meth)acrylate, pentaerythritol tri(meth)acrylate, dipentaerythritol penta(meth)acrylate, (meth)acrylates shown by formulas (1) or (2) below:

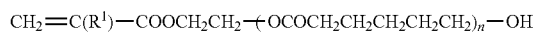

(1)

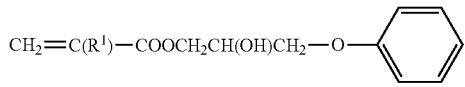

(2)

wherein $R^1$ is a hydrogen atom or methyl group and n is 1-15. Moreover, compounds obtained by addition reactions of compounds containing glycidyl groups, such as alkyl glycidyl ethers, aryl glycidyl ethers, glycidyl (meth)acrylate, etc., and (methyl)acrylic acid may also be used.

Among these (meth)acrylates containing hydroxyl groups, 2-hydroxyethyl (meth)acrylate, 2-hydroxypropyl (meth)acrylate, etc., are especially preferred.

These (meth)acrylates containing hydroxyl groups may be used individually or in combinations of two or more.

It is preferred for the proportions of the polyols, polyisocyanates, and (meth)acrylates containing hydroxyl groups used to be 1.1-2 equivalents of the isocyanate groups contained in the polyisocyanates and 0.18-1 equivalent of the hydroxyl groups of the (meth)acrylates containing hydroxyl groups per 1 equivalent of the hydroxyl groups contained in the polyols.

In these compounds, it is preferred to use, for example, urethanation catalysts such as copper naphthenate, cobalt naphthenate, zinc naphthenate, dibutyl tin dilaurate, triethyleneamine, 1,4-diazabicyclo[2.2.2]octane, 2,6,7-trimethyl-1,4-diazabicyclo[2.2.2]octane, etc., in quantities of 0.01-1 mass part per 100 mass parts of the total reactants. Moreover, it is ordinarily preferred for the reaction temperature to be from about 10° C. to about 90° C., and from about 30° C. to about 80° C. is particularly preferred.

Some of the (meth)acrylates containing hydroxyl groups may also be replaced by compounds with functional groups which can be added to the isocyanate group. Examples of these are γ-mercaptotrimethoxysilane and γ-aminotrimethoxysilane.

These compounds are chosen to be used when it is preferred to increase the adhesiveness to substrates such as glass.

Moreover, the urethane (meth)acrylates of component (A) may also be urethane (meth)acrylates which are obtained by reactions of polyisocyanates and (meth)acrylates containing hydroxyl groups, without having polyol components. Specific examples of such urethane (meth)acrylates are urethane (meth)acrylates with hydroxyethyl (meth)acrylates bonded to both ends of a 2,4-tolylene polyisocyanate, reaction products of equimolar 2,4-tolylene polyisocyanates, hydroxyethyl (meth)acrylate, and hydroxypropyl (meth)acrylate, etc.

It is preferred for the quantity of urethane (meth)acrylates which are obtained by reactions of polyisocyanates and (meth)acrylates containing hydroxyl groups, without having polyol components, that is compounded to be from about 0 mass % to about 50 mass %, and more preferred from about 0 mass % to about 20 mass %, of the total quantity of component (A).

It is preferred for the quantity of the urethane (meth)acrylate of component (A) to be from about 10 mass % to about 50 mass %, more preferred from about 15 mass % to about 40 mass %, and especially preferred from about 20 mass % to about 35 mass % relative to all of the components of the liquid radiation curable composition of the present invention from the points of view of obtaining the desired Young's modulus, breaking strength, breaking elongation, etc., of the cured radiation curable secondary coating for optical fiber.

Component (B) is a (meth)acrylate compound which has two or more ethylenically unsaturated groups and one or more bisphenol structures. Such compounds may be (B1) epoxy di(meth)acrylates comprising one or more bisphenol structures or (B2) di(meth)acrylates comprising one or more bisphenol structures which are compounds other than epoxy (meth)acrylates. One compound may be used as component (B), or two or more compounds may be used together. It is preferred for component (B) to be a (meth)acrylate compound which has two ethylenically unsaturated groups and one bisphenol structure. More preferably, component (B) is a compound shown by formula (3):

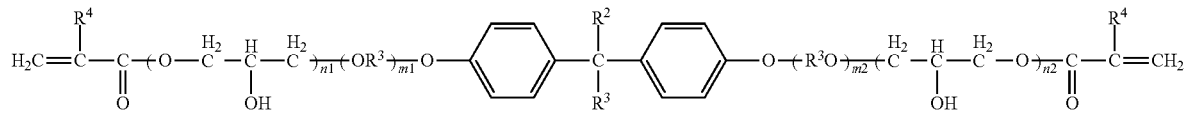

(3)

wherein the $R^2$ are, independently of each other, hydrogen atoms, fluorine atoms, or methyl groups, the $R^3$ are, independently of each other, alkylene groups with carbon numbers of 1-4, the $R^4$ are, independently of each other, hydrogen atoms or methyl groups, m1 and m2 are, independently of each other, 0-10, and n1 and n2 are, independently of each other, 0 or 1. However, both m1+n1 and m2+n2 are 1 or greater.

The epoxy (meth)acrylates with bisphenol structures (B1) are compounds with n1 and n2 both 1 in formula (3) above. Therefore, the epoxy (meth)acrylates with bisphenol structures have the structural characteristic of having hydroxyl groups. It is preferred from the point of view of curability for component (B) to be an epoxy (meth)acrylate with a bisphenol structure.

Suitable epoxy (meth) acrylates with bisphenol structures (B1) include epoxy di(meth) acrylates with bisphenol A structures, epoxy di(meth) acrylates with bisphenol F structures, epoxy di(meth) acrylates with bisphenol E structures, etc. Epoxy acrylates with bisphenol structures are preferred because they have better curabilities than epoxy dimethacrylates with bisphenol structures.

Commercial epoxy di(meth)acrylates with bisphenol A structures include, but are not limited to, Epoxy Ester 3000A (the compound shown by formula (b1) below, Epoxy Ester 3002A (N) (the compound shown by formula (b2) below (both products of the Kyoeisha Chemical Co.), as well as EPECRYL 600 (Daicel-Orunekusu Co.), BAEA-100 (KSM Co.), Agisyn 1010 (DSM-AI Co.), etc.

ine, diethanolamine, triethanolamine, etc.; phosphines, such as tributylphosphine, triphenylphosphine, etc.; phosphonium salts; sulfonium salts; acidic compounds such as phosphoric acid, p-toluene sulfonic acid, sulfuric acid, etc.; organic acid metal salts, such as chromium naphthenate, lithium naphthenate, zirconium naphthenate, etc.

Examples of the di(meth)acrylates with bisphenol structures which are compounds other than epoxy (meth)acrylates (B2) are compounds in which both n1 and n2 are 0 in formula (3) above. Examples of compounds which are di(meth)acrylates with bisphenol structures which are compounds other than epoxy (meth)acrylates are di(meth)acrylates of polyols in which ethylene oxide or propylene oxide has been added to bisphenol A or hydrogenated bisphenol A, di(meth)acrylates of polyols in which ethylene oxide or

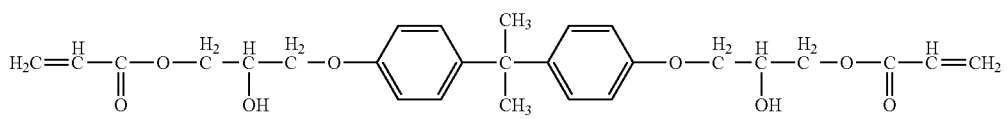

(b1)

(b2)

Commercial epoxy di(meth)acrylates with bisphenol F structures include, for example, BEFA-50 (KSM Co.). Commercial di(meth)acrylates with bisphenol E structures include, for example, BEEM-50 (KSM Co.).

Epoxy di(meth)acrylates with bisphenol structures can be synthesized by, for example, adding (meth)acrylates to diglycidyl ethers with bisphenol structures in the presence of publicly known catalysts which are used when synthesizing epoxy acrylates. All epoxy di(meth)acrylates with bisphenol structures which have been synthesized by such a method can be used ideally as components (B).

The publicly known catalysts which are used when synthesizing epoxy acrylates are not particularly limited, but one can ideally use, for example, alkali metals, such as lithium, sodium, and potassium; alkyl alkali metals, such as methyl lithium, butyl lithium, etc.; amine compounds, such as N-methyl morpholine, pyridine, tri-n-butylamine or dimethylbenzylamine, butylamine, octylamine, monoethylampropylene oxide has been added to bisphenol F or hydrogenated bisphenol F, di(meth)acrylates of polyols in which ethylene oxide or propylene oxide has been added to bisphenol E or hydrogenated bisphenol E, etc. Among these, ones with bisphenol A structures are preferred, and di(meth) acrylates with bisphenol A structures to which ethylene oxide has been added are especially preferred.

Examples of commercial di(meth)acrylates of polyols in which ethylene oxide or propylene oxide has been added to bisphenol A are ABE-300 (the compound shown by formula b3 below), A-BPP-3 (the compound shown by formula b4 below) (both products of Shin-Nakamura Chemical Co.); Light Acrylate BP-4EAL (the compound shown by formula b5 below), Light Acrylate BP-4PA (the compound shown by formula b6 below) (both products of Kyoeisha Chemical Co.); Bisukouto #700 (the compound shown by formula b5 below) (product of Daihan Organic Chemical Industry Co.); EBECRYL 150 (product of Daicel Orunekusu Co.); etc.

(b3)

$m + n = 3$ (b4)

(b5)

(b6)

$m + n = 4$ $m + n = 4$

If the compounds of component (B) are included at from about 20 mass % to about 80 mass %, preferably from about 25 mass % to about 60 mass %, and especially from about 27 mass % to about 50 mass % in the total liquid radiation curable composition of the present invention, it is desirable from the point of view of obtaining secondary coating layers with both surface curability and abrasion resistance.

Moreover, from the point of view of abrasion resistance, it is preferred for the content of component (B) in the composition to be from about 60 mass part to about 300 mass parts, more preferably from about 100 to about 300 mass parts, and most preferably from greater than 100 mass parts to less than or equal to about 250 mass parts, per 100 mass parts of the content of component (A).

The second aspect of the instant claimed invention is a radiation curable secondary coating composition of the first aspect, further comprising component (C) with one or more ethylenically unsaturated groups, said component (C) being other than components (A) and (B). Besides the compounds of components (A) and (B), which are required in the composition of the instant claimed invention the liquid radiation curable composition of the present invention may also optionally contain a component (C) which has one or more ethylenically unsaturated groups. As component (C) one can use polymerizable monofunctional compounds or polymerizable polyfunctional compounds. Here, "polymerizable monofunctional compounds" are compounds which have one ethylenically unsaturated group and "polymerizable polyfunctional compounds" are compounds which have two or more ethylenically unsaturated groups. As component (C), one may use one compound alone or two or more compounds in combination.

Suitable polymerizable monofunctional compounds are lactams containing vinyl groups, such as N-vinylpyrrolidone, N-vinylcaprolactone, etc.; (meth)acrylates containing alicyclic structures, such as isobornyl (meth)acrylate, bornyl (meth)acrylate, tricyclodecanyl (meth)acrylate, dicyclopentanyl (meth)acrylate, etc.; and benzyl (meth)acrylate, 4-butylcyclohexyl (meth)acrylate, acryloyl morpholine, vinyl imidazole, vinyl pyridine, etc. Additional suitable polymerizable monofunctional compounds include 2-hydroxylethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth) acrylate, butyl (meth)acrylate, amyl (meth)acrylate, isobutyl (meth)acrylate, t-butyl (meth)acrylate, pentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl(meth)acrylate, isostearyl (meth)acrylate, tetrahydrofurfuryl (meth)acrylate, butoxyethyl (meth)acrylate, ethoxycliethylene glycol (meth)acrylate, benzyl (meth)acrylate, phenoxyethyl (meth)acrylate, polyethylene glycol mono(meth)acrylate, polypropylene glycol mono(meth) acrylate, methoxyethylene glycol (meth)acrylate, ethoxyethyl (meth)acrylate, methoxypolyethylene glycol (meth) acrylate, methoxypolypropylene glycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth) acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether, etc.

Among these polymerizable monofunctional compounds, N-vinyl pyrrolidone, lactams containing vinyl groups, such as N-vinyl caprolactam, and isobornyl acrylate, lauryl acrylate, and 2-ethylhexyl acrylate are preferred.

Light Ester EH (Kyoeisha Chemical Co.), etc., can be used as a commercial product of a polymerizable monofunctional compound.

Suitable polymerizable polyfunctional compounds are trimethylol propane tri(meth)acrylate, trimethylol propane trioxyethyl (meth)acrylate, pentaerythritol tri(meth)acrylate, triethylene glycol diacrylate, tetraethylene glycol di(meth) acrylate, tricyclodecane dimethylol diacrylate, 1,4-butane polyol di(meth)acrylate, 1,6-hexane polyol di(meth)acrylate, neopentyl glycol di(meth)acrylate, tripropylene glycol di(meth)acrylate, neopentyl glycol di(meth)acrylate, pentaerythritol tri(meth)acrylate, pentaerythritol tetra(meth) acrylate, polyester di(meth)acrylate, tris(2-hydroxyethyl) isocyanurate tri(meth)acrylate, tris(2-hydroxyethyl) isocyanurate di(meth)acrylate, tricyclodecane dimethylol diacrylate, triethylene glycol divinyl ether, compounds shown by formula (4):

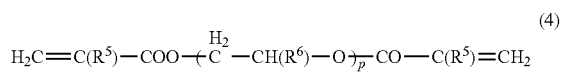

wherein $R^5$ and $R^6$ are, independently of each other, hydrogen atoms or methyl groups and p is a number from 1 to 10, etc.

Among these polymerizable polyfunctional compounds, compounds shown by formula (4) above, for example, ethylene glycol di(meth)acrylate, polyethylene glycol di(meth)acrylate, tricyclodecane dimethylol diacrylate, tris (2-hydroxyethyl) isocyanurate tri(meth)acrylate, and tripropylene glycol di(meth)acrylate are preferred, and among these, tripropylene glycol di(meth)acrylate is especially preferred.

Examples of suitable commercial products of these polymerizable polyfunctional compounds are Yupimaa UV and SA 1002 (Mitsubishi Chemical Co.); Aronikkusu M-215, M-315, and M-325 (Toagosei Co.), etc. Moreover, Aronikkusu TO-1210 (Toagosei Co.) can be used.

Among these compounds with ethylenically unsaturated groups (C), ones which contain from about 0 mass % to about 40 mass % of the whole liquid radiation curable composition of the present invention, are preferred, ones which contain from about 10 mass % to about 35 mass % are more preferred, and ones which contain from about 20 mass % to about 33 mass % are especially preferred.

Moreover, it is preferred for the mass ratio (B)/((B)+(C)) of the component (B) to the total quantity of components (B) and (C) to be about 50 mass % or more.

Furthermore, the liquid radiation curable composition of the present invention may comprise a polymerization initiator (D). As the polymerization initiators, thermal polymerization initiators or photoinitiators may be used. As component (D), one may use one compound alone or two or more compounds may be used in combination.

In cases in which the liquid radiation curable composition of the present invention is thermally curable, thermal polymerization initiators such as peroxides, azo compounds, etc., are ordinarily used. Specific examples are benzoyl peroxide, t-butyl-oxybenzoate, azobisisobutyronitrile, etc.

Moreover, in cases in which the liquid radiation curable composition of the present invention is photocurable, it is preferred to use photopolymerization initiators, and when necessary, photosensitizers along with them. Here, examples of photopolymerization initiators include, but are not limited to, 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoisopropyl ether, benzoisoethyl ether, benzyl dimethylketal, 1-(4-isopropylphenyl)-2-hydroxy-2-methyl-propan-1-one, 2-hydroxy-2-methyl-1-phenylpropan-1-one, thioxanthone, diethyl-thioxanthone, 2-isopropylthioxanthone, 2-chlorothioxianthone, 2-methyl-1-[4-(methylthio)phenyl]-2-morpholinopropan-1-one, 2,4,6-trimethylbenzoyldiphenyl phosphine oxide, and bis(2,6-dimethoxybenzoyl)-2,4,4-trimethylpentyl phosphine oxide. Examples of these are IRGACURE 184, 369, 651, 500, 907, CGI 1700, CGI 1750, CGI 1850, CG 24-61; Darocure 1116, 1173 (the above are products of BASF); Lucirin TPO (BASF Co.); Yubekuriru P36 (UCB Co.), etc.

Moreover, examples of photosensitizers are triethylamine, diethylamine, N-methyldiethanolamine, ethanolamine, 4-dimethylaminobenzoic acid, methyl 4-dimethylaminobenzoate, ethyl 4-dimethylaminobenzoate, isoamyl 4-dimethylaminobenzoate. Examples of these are Yubekuriru P102, 103, 104, 105 (UCB Co.), etc.

When the liquid radiation curable composition of the present invention is cured by using heat and ultraviolet light together, the aforementioned thermal polymerization initiators and photopolymerization initiators may also be used together. It is preferred for the polymerization initiators (D) to be present in the composition in a quantity of from about 0.1 mass % to about 10 mass %, especially from about 0.3 mass % to about 7 mass %, of the total liquid radiation curable composition of the present invention.

If necessary, various additives, for example, anti-oxidants, coloring agents, ultraviolet absorbents, photostabilizers, silane coupling agents, thermal polymerization inhibitors, leveling agents, surfactants, storage stabilizers, plasticizers, lubricants, solvents, fillers, anti-aging agents, wettability improvers, coating improvers, etc., may be included in the liquid radiation curable composition of the present invention, within a scope that does not harm the properties of the present invention.

Furthermore, the liquid radiation curable composition of the present invention is cured by heat and/or radiation; the radiation referred to here means infrared, visible light, ultraviolet, X-ray, electron beam, α, β, γ, etc., radiation.

For the sake of handling ability and coatability, it is preferred for the viscosity of the liquid radiation curable composition of the present invention to be from about 0.1 Pa·s to about 15 Pa·s at 25° C., preferably from about 0.3 Pa·s to about 10 Pa·s, and especially from about 0.5 Pa·s to about 9 Pa·s.

It is preferred for the coating films obtained by curing the liquid radiation curable composition of the present invention to show Young's moduli of from about 600 MPa to about 1500 MPa and preferably from about 700 MPa to about 1300 MPa. Moreover, it is preferred to show breaking elongation to be from about 5% to about 50% and preferably from about 15% to about 40%.

Furthermore, in forming the up-jacket layer, it is preferred for the coating film thickness to be 100-350 μm.

Additionally, one can also provide a cable layer consisting of a thermoplastic resin touching the outside of the optical fiber up-jacket layer.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non limiting examples.

WORKING EXAMPLES

Next, the present invention will be explained in detail by giving working examples, but the present invention is not limited to these working examples in any way.

Production Example 1

Synthesis of urethane (meth)acrylate (A) 1

0.24 g of 2,6-di-t-butyl-p-cresol, 355 g 2,4-tolylene diisocyanate, and 408 g polypropylene glycol with a number average molecular weight of 400 g/mol were added to a reaction vessel equipped with an agitator. After 0.80 g dibutyltin dilaurate was added gradually under cooling, agitation was performed for 1 hour at a liquid temperature of 65-75° C. After this, 237 g hydroxyethyl acrylate was dripped in while controlling the liquid temperature to 80° C. or below, after which the agitation was continued for 2 hours at a liquid temperature of 70-75° C., and the reaction was stopped when the residual isocyanate was 0.1 mass % or below. The obtained (meth)acrylate (A) is referred to as "UA1."

Production Example 2

Synthesis of urethane (meth)acrylate (A) 2

0.24 g of 2,6-di-t-butyl-p-cresol, 220 g of 2,4-tolylene diisocyanate, and 632 g of polypropylene glycol with a number average molecular weight of 1000 g/mol were added to a reaction vessel equipped with an agitator. After 0.27 g dibutyltin dilaurate was added gradually under cooling, agitation was performed for 1 hour at a liquid temperature of 65-75° C. After this, 147 g hydroxyethyl acrylate was dripped in while controlling the liquid temperature to 80° C. or below, after which the agitation was continued for 2 hours at a liquid temperature of 70-75° C., and the reaction was stopped when the residual isocyanate was 0.1 mass % or below. The obtained (meth)acrylate (A) is referred to as "UA2."

Production Example 3

Synthesis of urethane (meth)acrylate (A) 3

0.24 g of 2,6-di-t-butyl-p-cresol, 135 g of 2,4-tolylene diisocyanate, and 775 g of polypropylene glycol with a number average molecular weight of 2000 g/mol were added to a reaction vessel equipped with an agitator. After 0.27 g dibutyltin dilaurate was added, agitation was performed for 1 hour at a liquid temperature of 65-75° C. After this, 90.0 g hydroxyethyl acrylate was dripped in while controlling the liquid temperature to 80° C. or below, after which the agitation was continued for 2 hours at a liquid temperature of 70-75° C., and the reaction was stopped when the residual isocyanate was 0.1 mass % or below. The obtained (meth)acrylate (A) is referred to as "UA3."

Production Example 4

Synthesis of urethane (meth)acrylate (A) 4

0.24 g of 2,6-di-t-butyl-p-cresol, 32.9 g of 2,4-tolylene diisocyanate, and 945 g of polypropylene glycol with a number average molecular weight of 10 000 g/mol were added to a reaction vessel equipped with an agitator. After 0.27 g dibutyltin dilaurate was added gradually, agitation was performed for 1 hour at a liquid temperature of 65-75° C. After this, 90.0 g hydroxyethyl acrylate was dripped in while controlling the liquid temperature to 80° C. or below, after which the agitation was continued for 2 hours at a liquid temperature of 70-75° C., and the reaction was stopped when the residual isocyanate was 0.1 mass % or below. The obtained (meth)acrylate (A) is referred to as "UA4."

Production Example 5

Synthesis of urethane (meth)acrylate (A) 5

0.24 g of 2,6-di-t-butyl-p-cresol, 428 g 2,4-tolylene diisocyanate, and 0.80 g dibutyltin dilaurate was added to a reaction vessel equipped with an agitator. After this, 571 g hydroxyethyl acrylate was dripped in while controlling the liquid temperature to 80° C. or below, after which the agitation was continued for 3 hours at a liquid temperature of 70-75° C., and the reaction was stopped when the residual isocyanate was below 0.3 mass %. The obtained (meth) acrylate (A) is referred to as "UA5."

Working Examples 1-4, Comparison Examples 1-2

The composition components shown in Table 1 were charged into a reaction vessel equipped with an agitator, agitation was performed for 1 hour while the liquid temperature was controlled at 50° C., and liquid radiation curable compositions were obtained. The quantities compounded shown in the table are mass parts.

EXPERIMENTAL EXAMPLES

The liquid radiation curable compositions obtained in the working and comparison examples mentioned above were cured by the method described below to make test pieces, and the evaluations mentioned below were performed. The results are also shown in Table 1.

1. Viscosity:

The viscosities were measured by using a B type viscometer at 25° C., based on JIS-K7117-1D.

2. Young's Modulus:

The liquid radiation curable compositions were applied to glass plates by using a 250 μm thick applicator bar. They were cured by irradiating them with ultraviolet light with an energy of 1 J/cm$^2$ in air, and films for measuring the Young's moduli were obtained. Strip-shaped samples were obtained from these films in such a way that the drawn parts were 6 mm wide and 25 mm long, and a drawing test was performed at a temperature of 23° C. and a humidity of 50%. The Young's moduli were obtained from the tensile strengths at a drawing speed of 1 mm/min and a 2.5% strain.

3. Breaking Strength and Breaking Elongation:

The breaking strengths and breaking elongations of the test pieces were measured under the following measurement conditions, using a tensile tester (Shimadzu Seisakusho Co., AGS-50G).

| | |
|---|---|
| Drawing speed: | 50 mm/min |
| Distance between marks (measurement distance): | 25 mm |
| Measurement temperature | 23° C. |
| Relative humidity: | 50% RH |

4. Surface Curability Test:

The liquid radiation curable compositions were applied on glass plates by using a 70 μm thick applicator bar. They were cured by irradiating them with ultraviolet light with an energy of 0.5 J/cm$^2$ in air, and films for performing the surface curability test were obtained. These films were cut in two and the air sides were put together, after which the films were separated and the visible changes in the films were judged. If no whitening was observed, they were rated passing [◎], if a slight whitening was observed, they were rated passing [O], and if there was a large amount of whitening, they were rated failed [X].

5. Abrasion Resistance Test:

<Preparation of Optical Fiber Cables>

Metal wires 125 μm in diameter were coated with the liquid radiation curable compositions obtained in the working and comparison examples under the following conditions, using a rewinder (Yoshida Kogyo Co.) with an application/curing apparatus attached, and after the coating, the coated wires, with a diameter of 230 μm, were wound on bobbins. At this time, the line speed was 400 m/min. As the ultraviolet irradiation apparatus for curing the compositions that were applied, a UV lamp I 600M (D valve) made by the Fusion Co. was used. The quartz tube in the ultraviolet curing apparatus through which the optical fibers were passed was purged with nitrogen gas with an oxygen concentration of 3% at a flow rate of 10 l/min.

<Abrasion Resistance Test>

The optical fiber cables [10] obtained were fed from the bobbin [20] at a linear speed of 1000 m/s, in a state in which a tension of 320 kg/mm$^2$ was applied, and bent by approximately 4 degrees with a fixed stainless steel cylindrical rod [30] with a diameter of 5 mm. The secondary layers of the optical fiber cables [10] were cut with the stainless steel cylindrical rod [30] and the quantity of cut powder produced was judged by eye. If almost no cut powder was observed, they were rated passing [◎], if a small amount was observed, they were rated passing [O], and if there was a large amount, they were rated failed [X].

FIG. 1 shows an outline of the evaluation device.

However, the bending angle due to the stainless steel cylindrical rod [30] shown in FIG. 1 does not show the actual angle.

from outside and had good peelabilities. Consequently, the liquid radiation curable compositions of the present invention are useful as compositions for secondary coating layers of optical fiber.

The invention claimed is:
1. A radiation curable secondary ting composition for optical fiber which comprises:
   (A) at least two different urethane (meth)acrylate oligomers;
   (B) a (meth)acrylate compound with two or more ethylenically unsaturated groups and one or more bisphenol structures; and
   (C) a (meth)acrylate compound with one or more ethylenically unsaturated groups, said component (C) being other than components (A) and (B);
   wherein the content of component (B) in the composition is 100 to 300 mass parts per 100 mass parts of component (A).
2. The radiation curable secondary coating composition claim 1, wherein the content of component (B) in the composition is from greater than 100 mass parts to less than or equal to 250 mass parts per 100 mass parts of component (A).
3. The radiation curable secondary coating composition of claim 2, wherein the content of component (B) in the

TABLE 1

| Component (mass parts) | Working Example 1 | Working Example 2 | Working Example 3 | Working Example 4 | Comparison Example 1 | Comparison Example 2 |
|---|---|---|---|---|---|---|
| (A) UA1 | | | 10.0 | | | |
| UA2 | | 23.0 | | | 30.0 | |
| UA3 | 20.0 | 25.0 | | 20.0 | | 23.0 |
| UA4 | 1.0 | 2.0 | 2.0 | 1.0 | 2.0 | 1.0 |
| UA5 | | 18.0 | | | 48.0 | 32.0 |
| (B) Bisphenol A epoxy diacrylate | | 30.0 | 37.8 | 48.0 | | 13.9 |
| EO-modified bisphenol A diacrylate | 48.0 | | | | | |
| (C) Tripropylene glycol diacrylate | 32.0 | 27.0 | 25.2 | 32.0 | 5.0 | 25.7 |
| 2-Ethylhexyl acrylate | | | 4.0 | | 17.0 | 5.4 |
| (D) 1-Hydroxycyclohexyl phenyl ketone | 2.0 | 2.0 | 2.0 | 2.0 | 2.0 | 2.0 |
| 2,4,6-Trimethylbenzoyl diphenyl phosphine oxide | 0.4 | 0.4 | 0.4 | 0.4 | 0.4 | 0.7 |
| Total | 103.4 | 104.4 | 104.4 | 103.4 | 104.4 | 103.7 |
| Proportion of component (B) content (mass parts) per 100 mass parts of component (A) | 228 | 66 | 108 | 228 | — | 25 |
| Viscosity @ 25° C. (Pa · s) | 0.6 | 8.2 | 6.2 | 4.3 | 5.6 | 4.8 |
| Young's modulus (MPa) | 640 | 880 | 890 | 900 | 990 | 1140 |
| Breaking strength (MPa) | 30 | 39 | 38 | 39 | 41 | 46 |
| Breaking elongation (%) | 26 | 20 | 22 | 16 | 24 | 28 |
| Surface curability test | O | ◎ | ◎ | ◎ | X | X |
| Abrasion resistance test | ◎ | O | ◎ | ◎ | X | X |

In Table 1,
Bisphenol A epoxy diacrylate: compound corresponding to formula (b1) above. Agisyn 1010 (DSM-Agi Co.)
EO-modified bisphenol A diacrylate: Bisukouto #700 (Daihan Organic Chemical Industry Co.)
1-Hydroxycyclohexyl phenyl ketone: Irgacure 184 (Ciba Specialty Chemicals Co.)
2,4,6-Trimethylbenzoyl diphenyl phosphine oxide: Rushirin TPO (Ciba Specialty Chemicals Co.)

As can be seen from the results of Table 1, the cured products produced with the liquid radiation curable compositions of the present invention had high Young's moduli and small breaking elongations; therefore, they resisted harm composition is 50 mass % or more of the total quantity of components (B) and (C).

4. The radiation curable secondary coating composition of claim 3, wherein component (B) is an epoxy di(meth)acrylate comprising a bisphenol structure.

5. The radiation curable secondary coating composition of claim 3, wherein component (B) is a di(meth)acrylate comprising a bisphenol structure, wherein component (B) is other than an epoxy(meth)acrylate.

6. The radiation curable secondary coating composition of claim 3, Wherein component (B) is a compound shown by formula (3)

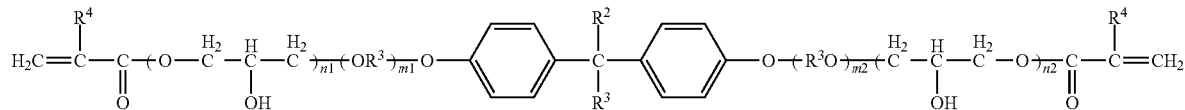

(3)

wherein
$R^2$ is selected from the group consisting of hydrogen atoms, fluorine atoms, and methyl groups;
$R^3$ are, independently of each other, selected from the group consisting of alkylene groups with 1-4-carbon atoms;
$R^4$ are, independently of each other, selected from the group consisting of hydrogen atoms and methyl groups;
m1 and m2 are, independently of each other, 0-10;
n1 and n2 are, independently of each other, 0 or 1;
m1+n1 is equal to or greater than 1; and
m2+n2 is equal to or greater than 1.

7. The radiation curable secondary coating composition of claim 6, wherein both n1 and n2 are 1.

8. The radiation curable secondary coating composition of claim 6, wherein both n1 and n2 are 0.

9. The radiation curable secondary coating composition of claim 3, wherein the one or more bisphenol structures in component (B) comprises a bisphenol A structure.

10. The radiation curable secondary coating composition of claim 9, wherein component (B) is included in the composition in an amount of about 20 mass % to about 80 mass %, relative to all of the components of the radiation curable secondary coating composition.

11. The radiation curable secondary coating composition of claim 9, wherein component (B) is included in the composition in an amount of about 25 mass % to about 60 mass %, relative to all of the components of the radiation curable secondary coating composition.

12. The radiation curable secondary coating composition of claim 9, wherein component (B) is included in the composition in an amount of about 27 mass % to about 50 mass %, relative to all of the components of the radiation curable secondary coating composition.

13. The radiation curable secondary coating composition of claim 1, wherein the radiation curable secondary coating composition has a viscosity at 25° C. from about 0.1 Pa·s to about 15 Pa·s.

14. A secondary coating layer on optical fiber, obtained by curing the radiation curable secondary coating composition of claim 13.

15. An optical fiber which comprises the secondary coating layer of claim 14.

16. A film obtained by curing the radiation curable secondary coating composition of claim 13, having a Young's moduli of from about 600 MPa to about 1500 MPa.

17. A film obtained by curing the radiation curable secondary coating composition of claim 9, having a breaking elongation from about 15% to about 40%.

18. The radiation curable secondary coating composition of claim 1, wherein at least one urethane (meth)acrylate oligomer is synthesized from a group of reactants comprising a polypropylene glycol with a molecular weight of about 10,000 g/mol.

19. The radiation curable secondary coating composition of claim 1, wherein component (C) comprises tripropylene glycol diacrylate.

20. The radiation curable secondary coating composition of claim 12, further comprising:
(D) a polymerization initiator, wherein the polymerization initiator is present in the radiation curable secondary coating composition in a quantity from 0.1 mass % to 7 mass %; and
optionally, one or more additives.

\* \* \* \* \*

UNITED STATES PATENT AND TRADEMARK OFFICE
CERTIFICATE OF CORRECTION

PATENT NO. : 10,370,557 B2
APPLICATION NO. : 15/527746
DATED : August 6, 2019
INVENTOR(S) : Hirofumi Uchida and Zen Komiya It is certified that error appears in the above-identified patent and that said Letters Patent is hereby corrected as shown below:

In the Claims

Please replace Claim 1 with the wording as follows. The claim should read 1. A radiation curable secondary coating.....

Signed and Sealed this
Twenty-eighth Day of January, 2020

Andrei Iancu
*Director of the United States Patent and Trademark Office*